Patented Oct. 24, 1950

2,527,497

UNITED STATES PATENT OFFICE 2,527,497

POLYVINYL ACETAL-RESINOUS PINE-WOOD EXTRACT COMPOSITION

Richard H. Hunt, Jr., Springfield, Mass., assignor to Monsanto Chemical Company, St. Louis, Mo., a corporation of Delaware No Drawing. Application November 28, 1944, Serial No. 565,576

12 Claims. (Cl. 260—27)

1

This invention relates to an improved composition of matter. More specifically the invention relates to a composition of matter comprising a polyvinyl partial acetal modified with the synthetic resin known commercially as Vinsol, being an extract from long-leaf, yellow pine tree stumps.

The Vinsol resins of this invention are the pine wood pitches described in U. S. Patent 2,193,026, issued March 12, 1940.

According to one method of producing Vinsol resins, long-leaf, yellow pine tree stumps are disintegrated or shredded, and the shredded material is extracted in large heated cylinders by means of a solvent such as benzol or some other suitable coal tar hydrocarbon. The solvent extracts the Vinsol resin along with rosin, turpentine, pine oil and miscellaneous other materials from the shredded stumps, after which the liquid is subjected to a distillation process. In the distilling cycle, the solvent is the first material to be removed, followed by the turpentine and finally the pine oil, and a residue consisting of rosin and Vinsol remains in the still. This resinous mixture is then extracted with a substance which is a solvent for the rosin but not a solvent for the Vinsol. As such a solvent there may be used, for example, and preferably at an elevated temperature, petroleum hydrocarbons such as petroleum ether, gasoline, heptane, hexane, etc., or an operable equivalent therefor.

The exact chemical composition of the Vinsol resin is not definitely known. It has been ascertained, however, that the Vinsol resin consists essentially of a highly oxidized form of abietic acid, and much smaller proportions of resin acids, polyphenols, ligneous materials, and unoxidized abietic acid. The oxidization of the abietic acid raises the melting point and results in a resin having a high melting point and free from the tackiness usually associated with ordinary rosins.

An object of this invention is to provide a new and improved composition of matter. A further object of this invention is to provide a composition of matter comprising a polyvinyl partial acetal modified with Vinsol resin.

These and other objects of this invention are obtained by incorporating Vinsol resin in a polyvinyl partial acetal which may be unmodified or may contain plasticizers, waxes, fillers, pigments, lubricants, solvents, natural resins, etc. The Vinsol resin may be incorporated with the polyvinyl partial acetal composition by any of the methods well known in the art of working plastic material, i. e., dry mixing in a Banbury mixer or on malaxating rolls or wet mixing in a

2 dough mixer with solvent and/or plasticizer, or mixing wet or dry in a ball mill, etc.

The compositions of this invention may be processed into sheets, rods, tubes, films, etc. by the methods known to the art. Thus, the compositions may be extruded, molded or cast from solvent solutions to form articles as desired.

Examples of typical formulas, according to the present invention, are as follows. Where parts are given, they are parts by weight.

*Formula I*

| | Parts |
|---|---|
| Polyvinyl butyraldehyde acetal | 100 |
| Vinsol | 100 |

*Formula II*

| | Parts |
|---|---|
| Polyvinyl butyraldehyde acetal | 100 |
| Vinsol | 50 |
| Stearic acid | 3 |

*Formula III*

| | Parts |
|---|---|
| Polyvinyl formaldehyde acetal | 100 |
| Vinsol | 50 |

*Formula IV*

| | Parts |
|---|---|
| Polyvinyl acetaldehyde acetal | 100 |
| Vinsol | 50 |

The amount of Vinsol may be varied from 10 to 100 parts based on 100 parts of the polyvinyl partial acetal by weight. Plasticizers, waxes, lubricants, fillers or pigments may be used in any proportions as desired.

The polyvinyl acetal resins of this invention may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. Patent to Morrison et al., Re. 20,430, dated June 20, 1937, illustrates suitable methods for preparing such resins. The polyvinyl acetal resins may be made from various aldehydes or mixtures thereof, or even from ketones containing an active carbonyl group.

Thus, formaldehyde, acetaldehyde, propionaldehyde, butyraldehyde, valeraldehyde, hexaldehyde, benzaldehyde, cyclohexanone and the like and mixtures thereof may be employed. In general, polyvinyl acetal resins made from lower aliphatic aldehydes are preferred, and, in particular, polyvinyl acetal resins made with saturated aliphatic aldehydes containing less than 6 carbon atoms and especially those made with butyraldehyde, are preferred. When the polyvinyl acetal resins contain ester groups, the nature of the ester groups may be substantially varied, but are preferably residues of saturated lower aliphatic acids such as acetic, propionic and butyric.

According to one embodiment of this invention, the polyvinyl acetal resins employed contain, on a weight basis, at least 5% hydroxyl groups calculated as polyvinyl alcohol and preferably, from 5 to 25% hydroxyl groups. These resins also contain up to about 30% ester groups calculated as polyvinyl ester, the ester groups preferably being acetate. The following are exemplary of different types of acetal resins.

When the acetal groups are butyraldehyde acetal, the resins employed may be considered to be made up, on a weight basis, of 12–22% hydroxyl groups calculated as polyvinyl alcohol and from 15–30% acetate groups calculated as polyvinyl acetate and the balance substantially acetal. According to another embodiment of this invention when the acetal groups are butyraldehyde acetal, the resins employed may be considered to be made up, on a weight basis, of 16–20% hydroxyl groups calculated as polyvinyl alcohol, up to about 3% acetate groups calculated as polyvinyl acetate and the balance substantially butyraldehyde acetal.

When the acetal groups are acetaldehyde acetal, the polyvinyl acetal resin employed may be considered to be made up, on a weight basis, of 5–15% hydroxyl groups calculated as polyvinyl alcohol, 15–20% acetate groups calculated as polyvinyl acetate and the balance substantially acetaldehyde acetal.

When the acetal is formaldehyde acetal, the polyvinyl acetal resin may be considered to be made up, on a weight basis, of 5–10% hydroxyl groups calculated as polyvinyl alcohol, 10–15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65–50 mol per cent acetaldehyde acetal and 35–50 mol per cent butyraldehyde acetal.

The compositions of this invention have the particular advantage over polyvinyl partial acetal compositions containing no Vinsol in that the softening point of the compositions of the invention are about 20° F. higher, a property which is extremely valuable in the use of such resins as electrical insulation or sound records which may be subjected to relatively high temperatures. For example, unplasticized polyvinyl butyral softens at about 80° F., whereas a composition comprising the same polyvinyl butyral resin modified with 50 parts of Vinsol per 100 parts of polyvinyl partial butyral has a softening point of at least 100° F.

Furthermore, the incorporation of Vinsol in the polyvinyl partial acetal raises the resistance to moisture of the resultant composition to a marked degree.

The compositions of this invention are particularly useful for making sound recording disks. The higher softening point minimizes tearing of the recording groove and distortion of reproduction under extremes of temperature. Furthermore, the amplitude, frequency response and tracking of disks made from the compositions of this invention are superior to disks made from unmodified polyvinyl partial acetals. The higher moisture resistance combined with the higher softening point of the new compositions make them especially valuable for sound records to be used in tropical areas where previous compositions for records have either softened under the high temperatures or warped due to the high humidities.

The foregoing is intended to be illustrative and not limitative of the invention as described in the appended claims.

What is claimed is:

1. A composition comprising 100 parts of a polyvinyl acetal resin containing on a weight basis, 5–25% hydroxyl groups calculated as polyvinyl alcohol, up to 30% acetate groups calculated as polyvinyl acetate and the balance substantially acetal, and from 10 to 100 parts of a resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

2. A composition as in claim 1 wherein the polyvinyl acetal resin is a polyvinyl butyraldehyde acetal resin.

3. A composition as in claim 1 wherein the polyvinyl acetal resin is a polyvinyl formaldehyde acetal resin.

4. A composition as in claim 1 wherein the polyvinyl acetal resin is a polyvinyl acetaldehyde acetal resin.

5. A composition moldable under heat, possessing high form stability at room temperature and high moisture resistance, comprising 100 parts of a polyvinyl formaldehyde acetal resin and from 25 to 100 parts of a resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

6. A composition moldable under heat, possessing high form stability at room temperature and high moisture resistance, comprising 100 parts of a polyvinyl acetal resin and from 25 to 100 parts of a resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

7. A composition moldable under heat, possessing high form stability at room temperature and high moisture resistance, and comprising approximately 100 parts of a polyvinyl acetal resin wherein the aldehyde employed to form such acetal resin is a lower aliphatic aldehyde, and from 25 to 100 parts of a resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

8. A composition as in claim 1 wherein the polyvinyl acetal resin is a polyvinyl butyraldehyde acetal resin containing on a weight basis, 12-22% hydroxyl groups calculated as polyvinyl alcohol, 15-30% acetate groups calculated as polyvinyl acetate and the balance substantially butyraldehyde acetal.

9. A composition as in claim 1 wherein the polyvinyl acetal resin is a polyvinyl butyraldehyde acetal resin containing on a weight basis, 16-20% hydroxyl groups calculated as polyvinyl alcohol, up to about 3% acetate groups calculated as polyvinyl acetate and the balance substantially butyraldehyde acetal.

10. A composition as in claim 1 wherein the polyvinyl acetal resin is a polyvinyl formaldehyde acetal resin containing on a weight basis, 5-10% hydroxyl groups calculated as polyvinyl alcohol, 10-15% acetate groups calculated as polyvinyl acetate and the balance substantially formaldehyde acetal.

11. A composition as in claim 1 wherein the polyvinyl acetal resin is a polyvinyl acetaldehyde acetal resin containing on a weight basis, 5-15% hydroxyl groups calculated as polyvinyl alcohol, 15-20% acetate groups calculated as polyvinyl acetate and the balance substantially acetaldehyde acetal.

12. A sound record disk possessing high form stability at room temperature and high moisture resistance, comprising the heat molded composition of claim 1.

RICHARD H. HUNT, JR.

REFERENCES CITED

The following references are of record in the file of this patent:

UNITED STATES PATENTS

| Number | Name | Date |
|---|---|---|
| 1,956,837 | Schmidt | May 1, 1934 |
| 2,060,856 | DeBell | Nov. 17, 1936 |
| 2,062,815 | Matheson | Dec. 1, 1936 |
| 2,114,393 | Lane | Apr. 19, 1938 |
| 2,130,239 | Hunter | Sept. 13, 1938 |
| 2,147,772 | Kallander | Feb. 21, 1939 |
| 2,193,026 | Hall | Mar. 12, 1940 |
| 2,221,540 | Hall | Nov. 12, 1940 |
| 2,361,418 | Robinson | Oct. 31, 1944 |